United States Patent
Sanchez et al.

(10) Patent No.: US 8,913,311 B1
(45) Date of Patent: Dec. 16, 2014

(54) NATURAL INK LIMIT ENCODING FOR DIGITAL COLOR MANAGED WORKFLOW SYSTEMS

(71) Applicant: Xerox Corporation, Norwalk, CT (US)

(72) Inventors: James Michael Sanchez, Rochester, NY (US); Guo-Yau Lin, The Woodlands, TX (US); David C. Robinson, Penfield, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 14/020,005

(22) Filed: Sep. 6, 2013

(51) Int. Cl.
*H04N 1/60* (2006.01)

(52) U.S. Cl.
USPC ............ 358/518; 358/1.9; 358/525; 358/523; 358/524

(58) Field of Classification Search
None
See application file for complete search history.

(56) References Cited

U.S. PATENT DOCUMENTS

| | | | |
|---|---|---|---|
| 6,938,977 | B2 | 9/2005 | Corbin et al. |
| 7,796,299 | B1 | 9/2010 | MacLeod |
| 8,159,715 | B2 | 4/2012 | Mestha et al. |
| 8,199,360 | B2 | 6/2012 | Gil et al. |
| 8,203,752 | B2 | 6/2012 | Maltz et al. |
| 8,270,029 | B2 | 9/2012 | Gil et al. |
| 8,335,015 | B2 | 12/2012 | Klassen et al. |
| 8,351,081 | B2 | 1/2013 | Elliot et al. |
| 8,358,453 | B2 | 1/2013 | Mestha et al. |
| 8,477,371 | B2 | 7/2013 | Fan et al. |
| 2005/0248598 | A1 | 11/2005 | Piatt et al. |
| 2009/0279112 | A1* | 11/2009 | Shestak et al. .................. 358/1.9 |
| 2010/0067060 | A1* | 3/2010 | Tin ............................... 358/3.23 |
| 2010/0085586 | A1* | 4/2010 | Tin ................................ 358/1.9 |
| 2013/0100465 | A1* | 4/2013 | Fischer et al. .................. 358/1.9 |
| 2013/0107291 | A1* | 5/2013 | Kuehn ........................... 358/1.9 |

FOREIGN PATENT DOCUMENTS

WO WO 2007/046928 4/2007

OTHER PUBLICATIONS

Zeng et al.; "Ink Limit Control for Inkjet Printer Color Calibration", Color Imaging: Device-Independent Color, Color Hardcopy, and Graphic Arts VI, Reiner Eschbach, Gabriel G. Marcu, Editors, Proceeding of SPIE vol. 4300; 2001, pp. 93-96.

* cited by examiner

*Primary Examiner* — Kimberly A Williams
(74) *Attorney, Agent, or Firm* — Pillsbury Winthrop Shaw Pittman, LLP

(57) ABSTRACT

Disclosed is a processor-implemented method for limiting ink output of marked image data using a target printer. A processor determines a constrained output (CMYK) LUT node data set for outputting the image data using the target printer to thereby mark the image data using a limited amount of ink. The constrained set is determined by re-encoding an encoded emulation output data, i.e., constraining an initial LUT node data set for the target printer based on a second. ICC profile with a smaller gamut. This allows the printer to inherit the smaller gamut. By constraining the initial LUT as disclosed herein, the final, constrained set emulates the smaller gamut in the target printer without suffering from pathological outcomes. The method enables the printer to inherit a natural ink limit methodology for the output colors that is more relatively proportional, and in a single destination profile.

17 Claims, 8 Drawing Sheets

NATURAL INK LIMIT ENCODING FOR DIGITAL COLOR MANAGED WORKFLOW SYSTEMS

BACKGROUND

1. Field

The present disclosure is generally related to an ink limiting method and algorithm. More specifically, this disclosure describes a method for constraining a look up table (LUT) node set by a smaller gamut.

2. Description of Related Art

In general, digital and offset press ink limiting algorithms have been static in technology for many years. Commonly, many known methods operate purely upon the CMY values destined for printing, which defeats color management when outputting images. Standard algorithms that operate on CMYK values only tend to operate without regard for managing the overall look of the image when printed, i.e., without color managing the results, and are primarily focused on reducing hardware operability issues such as: a) wet paper in offset presses, b) fuser overload in electrophotographic printing, and c) fuser curl in electrophotographic printing. Typically, an algorithm truncates CMY ink at specified maximum, while preserving K.

An example of a traditional approach for converting image data of device independent color space, e.g., CIE L*a*b* or RGB, into dependent color space, e.g., CMYK, is GCR (Gray Component Replacement). A GCR approach can be used to calibrate and/or control the total ink amount for CMYK printers (e.g., define the amount of GCR to be applied for any given color). It can include constraining or replacing an amount of the C, M and Y separations with a relative amount of the K separation, or vice versa.

Traditional approaches can be limited in their use with regards to CMYK data, and may not be able to reduce a total ink amount to lower percentage values. Because many ink limit algorithms are not color managed, when aggressive ink limits are placed to reduce ink amounts to lower percentage values (e.g., lower than 150 percent), they tend to eliminate the color managed nature of the workflow. For example, such approaches tend to limit ink amounts, to different values in different regions (i.e., values for C can be different than values for M), thus, resulting in unbalanced color and lesser image quality. Accordingly, standard ink limit algorithm(s) can result in image and color blocking when applying aggressive ink limits, as shown in FIGS. 1-3 and discussed later.

Further, many other visual print artifacts, like unbalanced image print outcomes where chromatic appearance is relevant, can be provided on the output or printed image, resulting in the printed image looking or appearing to be of lesser quality, leaving customers displeased. Other examples of effects on output images by current ink limiting algorithms include, but are not limited to: a) de-saturated red, green, and blue secondary colors that have been "ink limited" coupled with very saturated separations since the single separations at 100% are not affected by even an aggressive ink limit algorithm; b) blocking in dark, off-neutral colors due to dramatic clipped CMYK reduction by the simple algorithm; c) compromise of compression built into the output Look Up Table designed to deal with mismatched dynamic range between data encoding space (like RGB) and print space (CMYK—less dynamic range); and d) eliminating CMYK (values) without regard for color managed outcomes in digital printing. Workflow choices for ink limit can usually be limited to a selection of a number between 0 and 100% (inclusive) during the construction of profiling, but with no feedback on the impact of the ink limit on specific jobs in the workflow.

SUMMARY

It is an aspect of this disclosure to provide a method for transforming an ICC profile of a target printer used for outputting image data using a processor. The method includes the following acts implemented by the processor: for image data to be output: determine an initial output CMYK data set from a LUT table for a color gamut of an ICC profile to output the image data with the target printer; choosing a second ICC profile of a different printer having a limited color gamut, the color gamut of the ICC profile of the target printer having a greater range of CMYK values as compared to a lesser range of CMYK values of the limited color gamut of the second ICC profile; determining an encoded data set from the initial output CMYK data set that inherits the limited color gamut of the of the second ICC profile of the different printer, and determining a constrained output CMYK data set by re-encoding the determined encoded data set, which limits the initial output CMYK data set, in order to output the image data using the target printer based on the limited color gamut of the different printer.

Another aspect provides a processor-implemented method for limiting ink output of marked image data using a target printer associated with at least one processor for processing documents containing image data comprising a plurality of pixels. The method includes the following acts implemented by the at least one processor: receiving image data of a document having a plurality of pixels; determining an initial output LUT node data set for outputting the image data using the target printer, the initial output LUT node set being based on a first ICC profile having a first gamut for the target printer; encoding the initial output LUT node data set for output using the target printer; selecting a second ICC profile of a different printer having a smaller gamut than the first gamut of the first ICC profile of the target printer; further encoding the encoded output LUT node data set by using the selected second ICC profile to determine an encoded emulation data set for output using the smaller gamut of the second ICC profile; and determining a constrained output LUT node data set for outputting the image data using the target printer to thereby mark the image data using a limited amount of ink. The constrained output LUT node set is determined by re-encoding the encoded emulation output data set for output via the target printer, thereby constraining the first gamut of the determined initial output LUT node set by the smaller gamut.

In an embodiment, the constrained output LUT node set is converted into a third ICC profile for outputting the image data using the target printer, such that an amount of ink output by the target printer when the image data is output is constrained per the constrained first gamut. The image data can be marked using the target printer based on the third ICC profile (resulting from the determined constrained output LUT node set).

Yet another aspect provides a system for processing image data. The system includes: an input device for receiving a document containing image data, the image data having a plurality of pixels; at least one processing element for processing the pixels of the image data; and an output device for outputting the document. The at least one processing element is configured to: receive image data of the document; process the image data; determine CMYK values from an output LUT for outputting the image data using a gamut associated with an ICC profile of the output device; encode the CMYK values for outputting the image data; using a second ICC profile with a smaller gamut that is different than the gamut associated with the ICC profile of the output device, determine constrained CMYK values from the encoded CMYK values; encode the constrained CMYK values; and determine constrained CMYK values for outputting the image data using the output device by re-encoding the encoded constrained CMYK values to constrain the gamut of the ICC profile based on the smaller gamut. The at least one processing element can be further configured to: determine an updated, constrained output LUT using the determined constrained CMYK values to form an updated ICC profile used to outputting the image data with the output device.

Still another aspect provides a non-transitory computer readable medium having stored computer executable instructions. The computer executable instructions, when executed by a computer, direct a computer to perform a method for limiting ink output of marked image data using a target printer. The method includes: receiving image data of a document having a plurality of pixels; determining an initial output LUT node data set for outputting the image data using the target printer, the initial output LUT node set being based on a first ICC profile having a first gamut for the target printer; encoding the initial output LUT node data set for output using the target printer; selecting a second ICC profile of a different printer having a smaller gamut than the first gamut of the first ICC profile of the target printer; further encoding the encoded output LUT node data set by using the selected second ICC profile to determine an encoded emulation data set for output using the smaller gamut of the second ICC profile; and determining a constrained output LUT node data set for outputting the image data using the target printer to thereby mark the image data using a limited amount of ink. The constrained output LUT node set is determined by re-encoding the encoded emulation output data set for output via the target printer, thereby constraining the first gamut of the determined initial output LUT node set by the smaller gamut.

Other aspects, features, and advantages of the present invention will become apparent from the following detailed description, the accompanying drawings, and the appended claims.

DETAILED DESCRIPTION OF THE PREFERRED EMBODIMENT(S)

Figure 1:
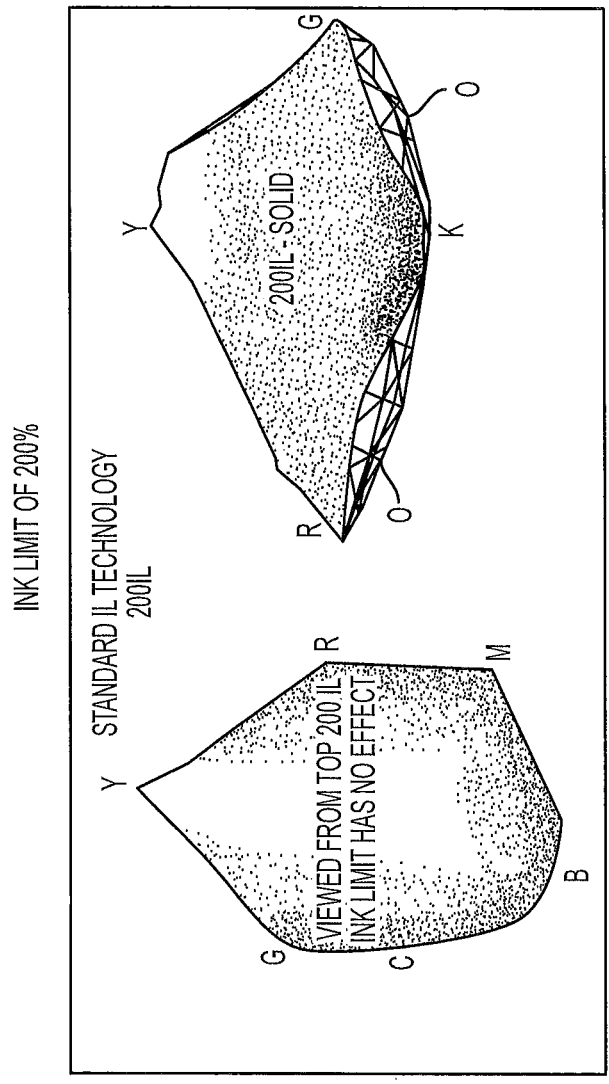
FIG. 1 shows a set of top and side views of a graphical representation of a limited gamut when using a prior art ink limiting method or system.

Disclosed is a processor-implemented method for limiting ink output of marked image data using a target printer. A processor determines a constrained output (CMYK) LUT node data set for outputting the image data using the target printer to thereby mark the image data using a limited amount of ink. The constrained output (CMYK) LUT node set is determined by re-encoding and constraining an initial output LUT node set for a first ICC profile and inheriting an encoded emulation output data set based on a second ICC profile with a smaller gamut. By constraining the initial CMYK nodes, the final replacement set of CMYK nodes emulates the smaller gamut in the target printer without suffering from pathological outcomes. Rather, the method enables the printer to inherit a natural ink limit methodology for the output colors that is more relatively proportional, into a single input-output LUT node set and in a single destination profile. It produces a non-pathological print outcome so that color output prints appear as higher quality images to the naked human eye, without readily visible imbalance of printed colors.

Throughout this disclosure there are a number of terms utilized that can be Understood by one of ordinary skill in the art. Although some definitions may be provided below and throughout this disclosure, they are not meant to be limiting.

A "target printer" is an output printer or press that "in use" and is used for raster image processing (or "RIP"-ping)(optional), marking, and outputting image data of a document (or page). It should be understood that the terms printer and press can be used interchangeably throughout to refer to an output device that is used for outputting processed image data. However, the type, model, or features associated with any mentioned output devices, printers, or presses is not intended to be limited to those noted herethroughout. The target printer can be referred to as the original printer that is being used for marking, but whose original or manufacturer-selected. ICC profile will be replaced.

An "ICC profile" is an industry standard profile format developed by International Color Consortium that describes the color capabilities, including the gamut, of a color device based on the differences between an ideal (provided by the manufacturer as the color reference file) and the current device, printer; or press used for output. The ideal or preferential ICC profile for a device is often provided by the manufacturer as a color reference file. Each device has its own device profile, either provided as part of the color management module (CMM) or system, available from the device's manufacturer, or included with third party hardware, software, or both. The CMM uses these profiles to convert one device dependent color space into the device independent reference color space and then to a second device dependent color space (that of the output device). Output profiles for devices such as printers, copiers, film recorders, and printing presses are also known as destination profiles. Throughout this disclosure, the ideal ICC profile for an output printer is referred to as "a first ICC profile" or a "target printer ICC profile," and is an ICC profile that is used to output image data with the target printer without any emulation or manipulation. The first ICC profile includes information on the color gamut for the target printer, or "a first gamut." The gamut refers to a range of colors, e.g., CMYK and RGB. Throughout this disclosure, reference to a "gamut" or "color gamut" refers to a device gamut, i.e., the range of colors that a print device can produce and/or reproduce when printing an image. As understood in the art, each device may have a different gamut and thus produce a different range of colors. The device gamut is based on an output image (which has an image gamut, i.e., a range of colors in a particular image). The first gamut, then, in this disclosure, refers to a range of colors produced by a target printer, and is included in the target printer (or first) ICC profile. The first gamut of the first ICC profile is manipulated and constrained in this disclosure.

A "LUT" refers to a look up table, as known in the art. A LUT includes an output data for outputting ink/color via the target printer, also referred to as an initial output LUT node set. An initial output CMYK data set is determined from a LUT of the first ICC profile of the target printer.

Throughout this disclosure, the selected ICC profile for an output printer to emulate is referred to as "a second ICC profile" or "another printer ICC profile" from "another printer" (e.g., selected by a user)(also referred to as "other printer" or "different printer" herethroughout), and is an ICC profile that is used to constrain the characteristics associated with marking and outputting image data with the target printer (e.g., the LUT table). The selected or other printer is a different device than the target printer. The second ICC profile includes information on the color gamut for another printer that is different than the target printer, and, in some cases, limited or smaller as compared to the first gamut, and thus referred to herein as "a second gamut" (i.e., the second gamut produces a different range of colors). The first gamut can have a greater range of CMYK values as compared to a lesser range of CMYK values of the second gamut. The second gamut of the selected ICC profile is used to manipulate and optionally constrain the first gamut in this disclosure.

As understood throughout, reference to "inheriting" refers, but is not limited to, the target printer internally limiting the first gamut of the target printer based on the second gamut from a selected ICC profile of other printer (e.g., a boundary within a LUT or LUTs), the internal part of the other printer, and intersection with the image encoding space. The compression associated with the other printer's internal characteristics, e.g., gamut, mapping techniques, etc. can also be inherited. As described herein, the target printer is designed to "inherit" characteristics from the selected or another printer, thereby reducing the output ink that used to print the image data or document, while preserving color(s) (e.g., in the constrained or restricted gamut/third ICC profile/new LUT).

A "constrained output LUT node set" (or "constrained LUT node set") herethroughout refers to an output data set for output via the target printer that is determined by constraining the first gamut of the target printer by the smaller gamut, and that can be used for outputting ink/color via the target printer. Constrained CMYK values are determined from the constrained output LUT. These constrained values and/or the constrained output LUT node set can be used to form an updated ICC profile (or "third" profile, otherwise known as the limited or constrained profile/data set/LUT of the first ICC profile) that is used to outputting the image data with the target output device. In accordance with an embodiment, constraining the first/initial gamut or LUT includes proportionally limiting the color data values (e.g., based on the smaller gamut). Reference to encoding or "encoded" data sets refers to converting or transforming data using a standard source profile(s) into a form or code that is suitable for output using an output device or printer, e.g., the target printer. For example, it can include conversion between L*a*b* and CMYK data, or vice versa.

These and other, additional terms are also (further) defined throughout this disclosure.

The method and algorithm as disclosed herein can be utilized by a processor and/or ICC management system having a device-independent or reference color space, device profiles that define the color characteristics of a particular device and enables conversion between dependent and independent color spaces, and a color management module (CMM) that interprets the device profiles and carries out instructions for color gamuts of each device.

Referring back to the known art, ink limit technology has long remained entrenched in the domain of simple truncation of CMY, with the preservation of single separation primaries as its base technology. The ink limit is targeted at meeting printer physical constraints like avoiding wet paper for rapid drying, or, avoiding large pile heights in electrophotography to lengthen the life of fusing technology and avoid paper curl, for example. As noted previously in the background, because prior ink limit algorithms are not color managed, they tend to eliminate the color managed nature of the workflow, such as when an aggressive ink limit is set for printing an image or document. Because such approaches tend to limit ink amounts unevenly and disproportionately, the printed image has an overall lesser image quality.

In general, a simple, linear, reduction formula is related to a percentage (%) ink limit that is used for outputting an image or a document. In CMYK printing, a maximum amount of ink to be placed on a page is 400 percent (%); i.e., up to and including 100% of each of the 4 colors—cyan (C), magenta (M), yellow (Y), and black (K). Each color can be in a range of 0 percent (%) to 100 percent (%) (inclusive).

A rendered job contains nine squares of CMYK in the noted combinations (C, M, Y, K in percent (%)):

100, 0, 0, 0 (cyan)
0, 100, 0, 0 (magenta)
0, 0, 100, 0 (yellow)
0, 0, 0, 100 (black)
100, 100, 0, 0 (blue)
0, 100, 100, 0 (red)
100, 0, 100, 0 (green)
100, 100, 100, 100 (rich black)
100, 100, 100, 0 (rich CMY)

One or more of these percentages can change based on the selected percentage at which to limit ink. For example, for an ink limit of 200 percent (%), a typical or common default method for this ink limit can manipulate the above values in the following manner:

100, 0, 0, 0 (cyan)
0, 100, 0, 0 (magenta)
0, 0, 100, 0 (yellow)
0, 0, 0, 100 (black)
100, 100, 0, 0 (blue)
0, 100, 100, 0 (red)
100, 0, 100, 0 (green)
33, 34, 33, 100 (rich black)
66, 67, 66, 0 (rich CMY)

Attributes of this above standard ink limit (i.e., at 200 percent) may include, for example, blunt force reduction of C, M, and Y by simple subtraction of CMY to meet a total percent (%) target (e.g., see reduced amounts for rich black and rich CMY). No effort is made in known systems or methods to preserve any aspect of the original color; hence, color managed outcomes are destroyed by known ink limit approaches. Also, standard ink limits tend to aim for preservation of black (K) always, despite the amount of ink limit percentage. Although this may preserve the dynamic range of the printer, such features are not always necessary or desired where ink limits are relevant. Further, at 200 percent there can remain substantially equal distribution of the starting color among the C, M, Y values remaining after the limit has been applied. This also destroys any color managed nature of the associated LUT.

FIG. 1 shows top and side graphical views of an ink-limited gamut for CMYK and RGB after ink limiting to 200 percent (%) (200IL) based on such prior or known ink limiting methods or systems. The original or full gamut of the printer is shown as line or wire portions O of the three-dimensional (3D) depiction, while the 200IL gamut is depicted as a solid portion with shading. As understood by one of ordinary skill in the art, a restricted gamut such as shown in FIG. 1 can be used to develop or produce a look up table (LUT) based on the restricted or limited ink requirements, so that the marking or RIPping (raster image processing) processes during output of image data corresponds thereto. As shown in FIG. 1, after application of the 200IL, chromatic peaks are preserved, but dark colors are substantially reduced or removed (e.g., see bottom areas O in side view of graphic in line or wire form, which represent the original full gamut O of the printer; rich black and rich CMY values in the example above). When implemented for the specific use of limiting ink on pages to keep the pages from becoming too wet, or the pile height too high, for example, an approach such as may be implemented, since there is concave removal of ink in these dark colors.

There are applications, however, where more aggressive ink limits are desired, for any number of reasons. In competitive high speed digital printing systems, run costs relative to profit are razor thin, and, managing ink down to very low levels for some jobs is desirable. In such cases, the standard ink limit methods begin to fail. Pathological outcomes appear to begin when ink limitations are set below 200 percent, as shown by the graphical view in FIG. 2, when using prior or known ink limiting methods or systems. For example, in view of the above-noted rendered job containing nine squares of CMYK in the noted combinations, a typical default method for an ink limit of 150 percent (%) can manipulate the values in the following manner:

100, 0, 0, 0 (cyan)
0, 100, 0, 0 (magenta)
0, 0, 100, 0 (yellow)
0, 0, 0, 100 (black)
75, 75, 0, 0 (blue)
0, 75, 75, 0 (red)
75, 0, 75, 0 (green)
16, 17, 16, 100 (rich black)
50, 50, 50, 0 (rich CMY)

Figure 2:
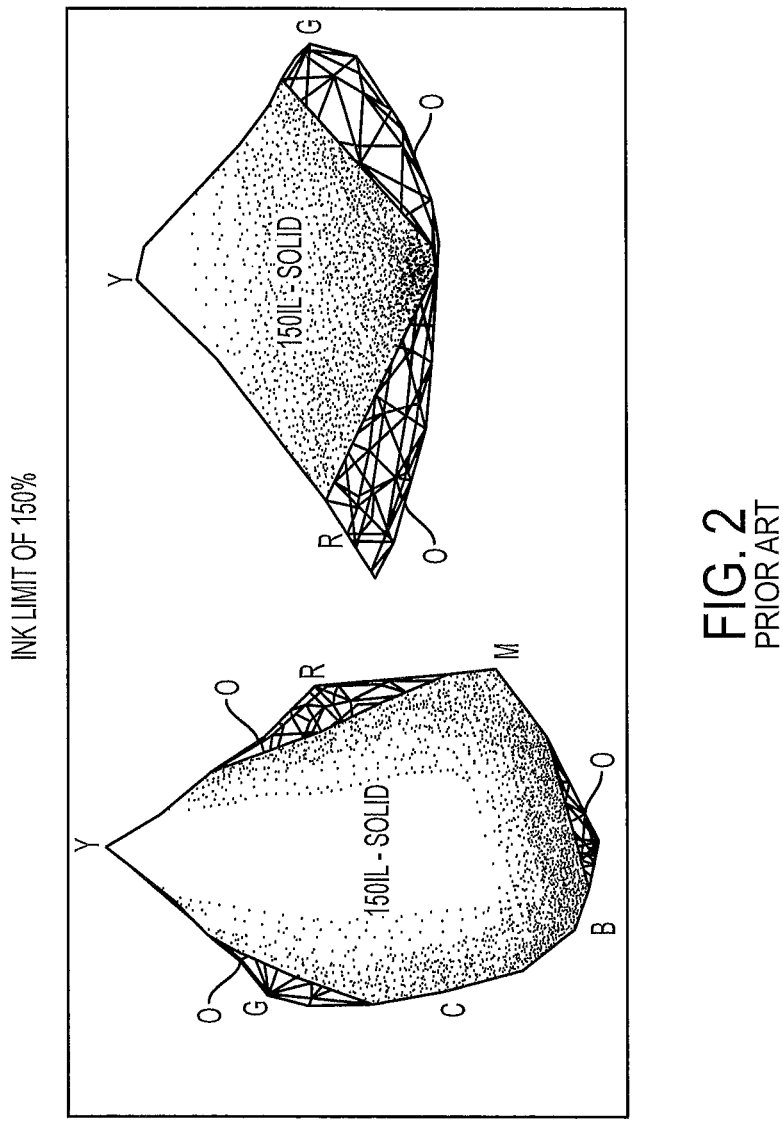
FIG. 2 shows another set of top and side views of a graphical representation of a further limited gamut when using a prior art ink limiting method or system.

FIG. 2 shows top and side graphical views of a gamut for CMYK and RGB after ink limiting to 150 percent (%) (150IL) using known ink limiting methods or systems. The original or full gamut of the printer is shown as line or wire portions O of the three-dimensional (3D) depiction, while the 150IL gamut is depicted as a solid portion with shading. As can be understood by observing the illustration of the limited gamut in FIG. 2, there can be an onset of image quality outcomes and/or defects in standard ink limiting methods as the total percentage of ink for output substantially decreases. Standard ink limit technologies dramatically reduce color saturation, and color, for red, green and blue (two separation mixture colors that exceed the 150% ink limit), but, do nothing to reduce the ink for the four single separations. Cyan, magenta, and yellow are substantially preserved in FIG. 2, as shown in the top view of the graph, while dramatically reducing red, green, and blue (see areas O in top and side Views). Thus, for any print job using a standard method that is implemented with this ink limit, CMY can be saturated and fully chromatic, but RGB will be desaturated, if not essentially gone. Hence, for a print shop or customer attempting to obtain an aggressive ink limit and a semblance of good image quality (with part of that quality being similarity of chroma output for saturated input colors), the standard ink limit methods fail.

As a final example, a more aggressive ink limit of 100 percent (%) is analyzed. In some cases of high speed printing, for example, such limits can be applied to minimize dry time, and, also or alternatively, to minimize ink costs. Furthermore, for dry ink presses, a very aggressive ink limit is needed to realize the cost targets per print for customers.

Figure 3:
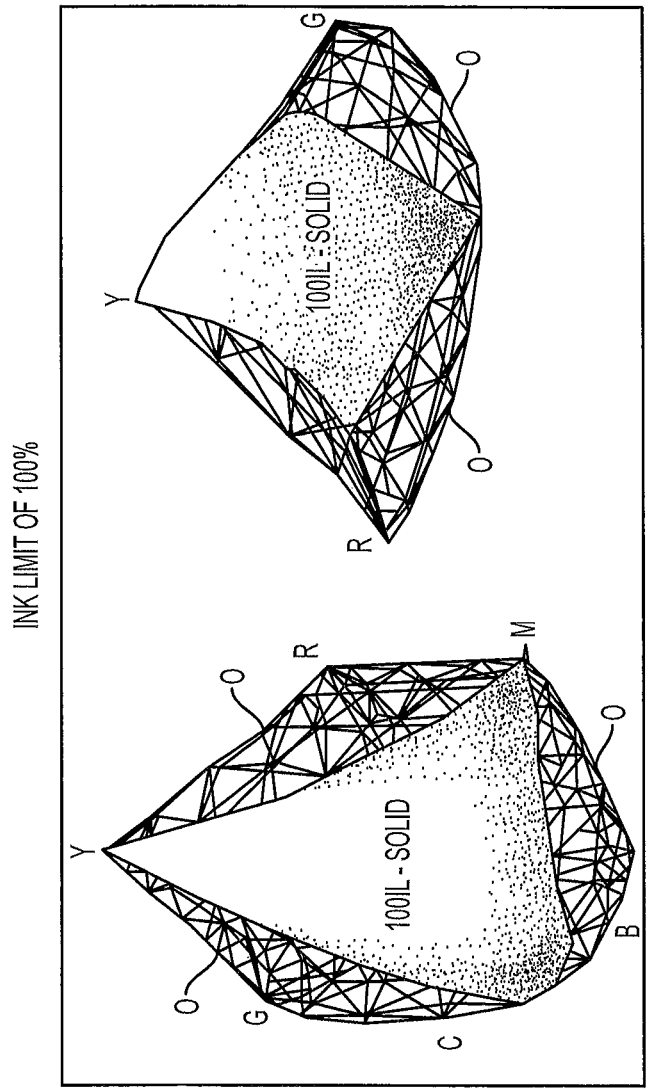
FIG. 3 shows yet another set of top and side views of a graphical representation of a still further limited gamut when using a prior art ink limiting method or system.

Although exemplary color values are not provided for this example, FIG. 3 shows top and side graphical views of a gamut of CMYK and RGB after ink limiting to 100 percent (%) (100IL) using standard ink limiting methods or systems. Again, the original or full gamut of the printer is shown as line or wire portions O of the three-dimensional (3D) depiction, while the 100IL gamut is depicted as a solid portion with shading. As shown, there is a serious color imbalance, which results in very low image quality (as pertaining to color output). The reds, greens, and blues are completely de-saturated, while highly or fully chromatic Magenta, cyan and yellow substantially remain. Accordingly, it can be seen that as the ink limiting method becomes progressively more aggressive, the resultant print gamut of standard methods becomes progressively more pathological. Relative relationships between input colors are completely destroyed by the classic ink limit method(s), thereby producing a pathological print outcome for aggressive ink limiting. As seen by these graphical representations, all of the impact of the more aggressive link limit occurs to the mixture colors red, green and blue, massively de-saturating those colors. Simultaneously, the primary colors C, M, and Y are preserved almost completely. Thus, when implementing standard technologies at such aggressive ink limits as these (e.g., 100%), a color print output containing a red and a magenta spot color, or, red and magenta dress in an image, for example, will appear very strange. The red will lack color and be very de-saturated, and, the magenta will be very colorful and saturated.

Both colors can be potentially printed and should be printed on the same page when desired for output of an image, even with ink limitations. Existing ink limit methods tend to remove ink at the expense of a color managed result. As shown by the exemplary graphics of FIGS. 1-3, it can be seen that an elimination or removal of the use of color management by operating solely on the CMYK values provides negative results on an output or printed image. The output LUT CMYK nodes no longer bear any resemblance, at some points in the LUT, to the color specification in PCS. Clearly, a method is needed that enables a very aggressive ink limit while simultaneously offering some semblance of reasonable output where visual similarity between colors is relevant.

Rather than use controls to produce a LUT when there are ink limitations, this disclosure employs a closed loop control method to affect a high accuracy LUT based color outcome and inherits accuracy in the profile and RIP processes. As will become evident by the details described herein and below, this disclosure provides a method and algorithm for such features within a single ICC profile through a series of LUT transformations to from a single LUT. Accordingly, this disclosure provides both a method of emulating another press within a single ICC profile plus a method of ink limiting via another press profile. This method is distinct as it results in complete printer emulation in a single destination profile. It is also distinct from the classical method of ink limiting output LUT nodes after inversion with a simple algorithm.

Figure 4:
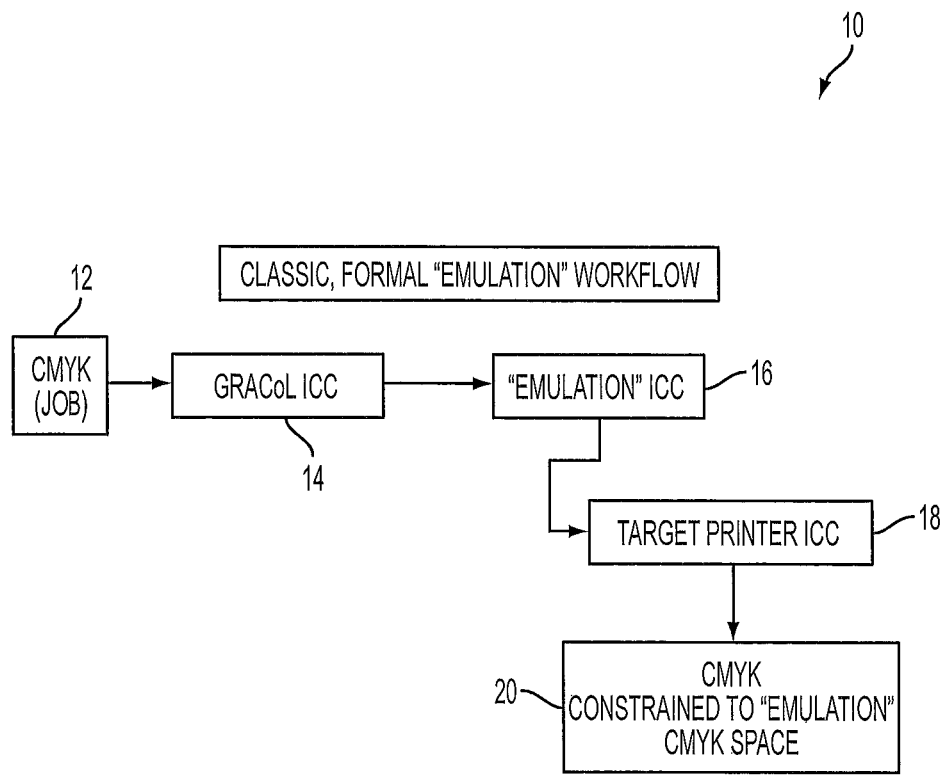
FIG. 4 illustrates a flow chart showing a prior art method for emulation workflow.

Of course, "emulation" is a standard workflow that is understood by one of ordinary skill in the art, that typically use a series of source profiles in connection with RIP to a destination profile to affect an outcome. Such features are performed in a digital front end (DFB) of a system, for example. FIG. 4 illustrates a simple, classic RIP-based CMYK Emulation work flow or method 10, as known in the art, and which is provided for explanatory purposes only. In general, at 12, a print job from a customer for printing in CMYK space (or other device dependent space) is received and processed, such as a PDF file. In the classic emulation workflow, the CMYK image data is associated with a source CMYK profile at 14, e.g., shown in FIG. 4 as using CMYK "GRACoL"® standard profile, to incorporate the CMYK image data into a color space. To emulate another printer, the colors are converted to another potential emulation ICC profile at 16 and into another set of colors. Finally, this set of colors is sent to a target printer at 18 to print in an ICC profile of CMYK, resulting in the CMYK data being constrained to an "emulation" CMYK space at 20.

There are limitations with regards to the standard/known emulation method illustrated in FIG. 4, however. For example, in the above illustrated method, there is included: a) a target printer system (i.e., printer being used for marking and output) using a CMYK, standard, print gamut (non-limiting examples of such a system include FOGRA coated, Japan Color Type 1, ISO Coated, HP® Indigo, and other platforms), b) a CMYK print job encoded with the GRACoL® profile, e.g., via the embedding of a profile within a PDF format, and c) an ICC source profile for a smaller gamut printing system that already exists that is desired for emulation. For example, such an emulation ICC profile can have, in the BToA tags, gamut mapping, GCR, etc. Examples of such an ICC profile may include, but are not limited to: PSO_Uncoated_ISO12647_eci.icc, Japan Color Type 4, and Fogra Uncoated, Any number of existing profiles designed and built for small gamut printing systems can be used. Accordingly, known emulation methods such as shown in FIG. 4 requires that ICC profiles for each printing system are obtained, since digital printing is being considered:

1. The actual, larger gamut printing system wished to constrain with ink limit,
2. The CMYK job encoding space (in this example, GRACoL®), and
3. A CMYK smaller gamut print space (space for emulation).

However, not all printing systems or presses can do a complete, true, emulation workflow during RIP, including coupling the RGB path properly. The implementation of the above workflow, with RIP, is complex. Not all RIPs are capable of obtaining all three ICC profiles and performing a complete RIP to implement and perform such an emulation. Further, the ability to detect in the job the embedded source profile, and associate that with the CMYK, and then select or use an emulation ICC, and RIP that to a printer, is not something that every DFE does or is capable of. Such processes can be hard to accomplish in a front end environment, and some DFEs of printers or presses just do not do it. Some DFEs do not support the combined, emulation for RGB jobs. Some DFEs do not even support the above workflow for CMYK jobs. For example, FFPS current default RIP path does not support this emulation pathway for CMYK print jobs. Even for the high end RIPs that do fully support the above workflow, the RIP speed is slower, and, the overall RIP complexity is high for complex jobs.

Instead of having multiple ICC profiles that have to be assembled by a RIP and have bits processed through multiple different profiles, then, this disclosure instead provides a method proposed to encode features of the classic emulation workflow of FIG. 4 into a single LUT, which takes on a form of a single destination ICC profile. The disclosed method can be implemented into even the simplest of digital printing systems. As described further below with reference to FIGS. 5-7, instead of utilizing multiple (e.g., three) ICC profiles, the proposed algorithm instead, upon receipt of a print job, process the image data to result in a set of CMYK values for printing with a target printer that are constrained to both the print job encoding space (e.g., GRACoL®) and the encoding space to be emulated. In particular, such determinations are performed in one ICC profile.

Figure 5:
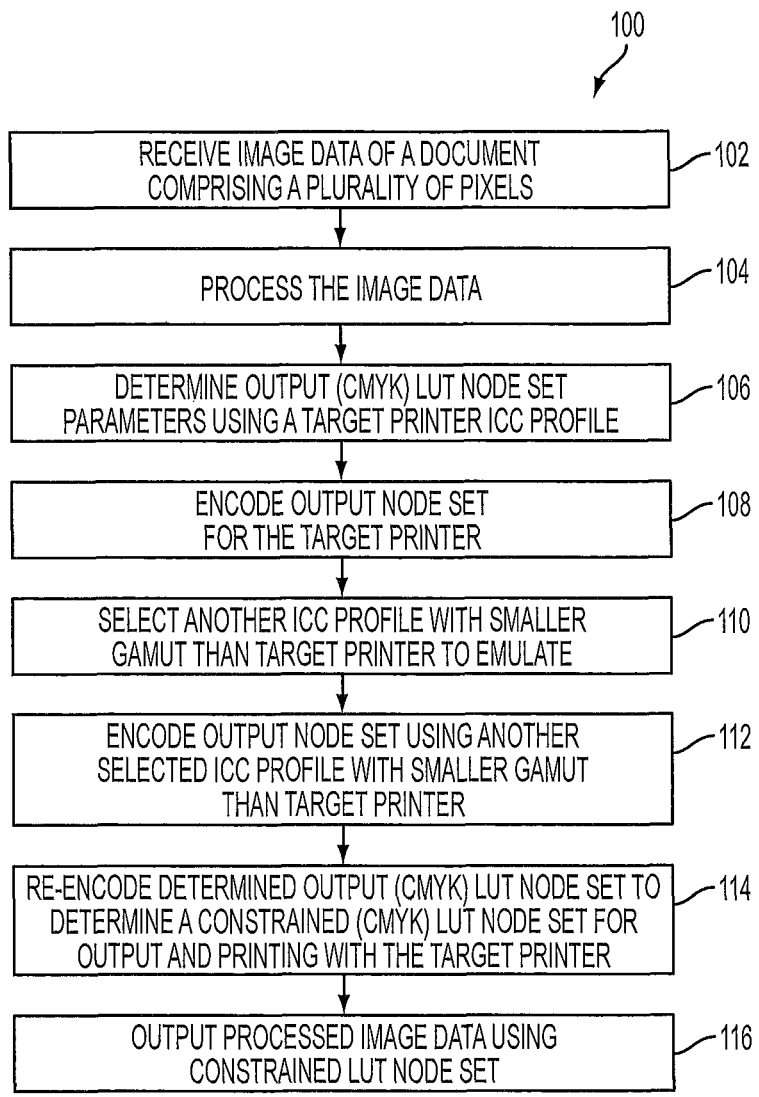
FIG. 5 illustrates a flow chart for a processor-implemented method for limiting ink output of marked image data in accordance with an embodiment of this disclosure.

FIG. 5 illustrates a flow chart for a processor-implemented method 100 for limiting ink output of marked image data in accordance with an embodiment of this disclosure. The method 100 is implemented on a desired target printer or press (e.g., see output device 514 of FIG. 8) for marking the image data that is associated with at least one processor (e.g., 504 of FIG. 8) for processing documents containing image data comprising a plurality of pixels. Referring to FIG. 5, at 102, image data of a document having a plurality of pixels is received and processed at 104. An initial output LUT node data set for outputting the image data using the target printer is determined at 106. Then, at 108, the initial output LUT node data set for output using the target printer is encoded. A second or another ICC profile of a different printer having a smaller gamut than, or a limited color gamut as compared to, the first gamut of the first ICC profile of the target printer is selected at 110, such that the target printer can emulate the features of the second ICC profile, including its reduced gamut. It should be understood at 110 that selection can include pre-selection and determination of a pre-selected (second) ICC profile. For example, another or different ICC profile of a printer a customer wishes to emulate can be selected prior to the start of the process 100 (e.g., per a user interface (UI), as described in detail later). Thus, selection at 110 may include determining or selecting for use the associated ICC profile of the pre-selected printer.

Furthermore, it should be further understood that selection may include pre-selection of an ink limit, and does not necessarily require that a specific printer or ICC profile be selected. That is, the selection of the second or another ICC profile may entail a user selecting a total ink limit (e.g., percentage) at which to limit the output document, and one or more processes may be applied to determine or select an appropriate, corresponding, and/or best selected alternate printer or profile to emulate. Additional determinations with regards to user selections (e.g., via a user interface) are further explained later. As such, selection of the second ICC profile at 110 as used throughout this disclosure is not intended to be limited to direct selection thereof, After another ICC profile is selected or determined at 110, then the method 100 includes further encoding at 112 an encoded, emulation constrained LUT node data set. This can be determined by using the selected (second) ICC profile to constrain and then encode the encoded output node set for the target printer (from 108) (e.g., determine constrained CMYK values from the encoded CMYK values (e.g., by limiting to the smaller gamut), and encode the constrained CMYK values). The constrained and encoded data forms an "encoded emulation data set."

At 114, a constrained output LUT node data set for outputting the image data using the target printer [to thereby mark the image data using a limited amount of ink] is determined. The constrained output LUT node set is determined by re-encoding the encoded emulation output data set for output via the target printer, thereby constraining the first gamut of the determined initial output LUT node set by the smaller gamut. This constrained LUT node set is used to build or produce a final, updated ICC profile (also referred to as a "third ICC profile" throughout this disclosure) for outputting image data using the target printer. Accordingly, the method 100 allows for marking and output of the image data using the target printer based on the limited color gamut of the different printer/third ICC profile, since the gamut of the target printer is constrained thereto. Therefore, an amount of ink output by the target printer when the image data is output is constrained per the constrained first gamut.

Optionally thereafter, the constrained output LUT node data (or updated ICC profile) set can be communicated to the target printer, such that the processed image data can be marked and output, as shown at 116 in FIG. 5, using the target printer, but based on the determined constrained output LUT node set.

Although the description above references and FIG. 5 illustrates processing steps that reference the LUT, it should be understood that such steps can be referenced as being applied to CMYK data. That is, one of ordinary skill in the art should understand that reference to LUT node set refers to the CMYK (or other device dependent) data used in and to form the LUT. For example, in an embodiment, the initial output LUT node set determined at 106 can be based on the ICC profile for the target printer (or first ICC profile having a first gamut). In an embodiment, the set can include output CMYK data that is obtained from a LUT table for a color gamut of a target printer ICC. In an embodiment, the determination of the constrained data set includes limiting the initial output CMYK data using the determined encoded emulation data set. In an embodiment, the initial output CMYK data set is constrained or limited in a proportional manner by the encoded emulation data set.

In an embodiment, the initial output LUT node set and constrained output LUT node set are processed in CMYK space, and the encoded output LUT node set and emulation encoded output LUT node set are PCS encoded in CIE Lab space.

Further, although reference may have been made above in the description of method 100 to a certain device independent space (e.g., CIE L*a*b*) and a certain device dependent space (e.g., CMYK), it should be understood that other device independent or device dependent color space(s) can be used without departing from the scope of this disclosure (e.g., CIE XYZ space, Adobe® spaces, etc.).

Figure 6:
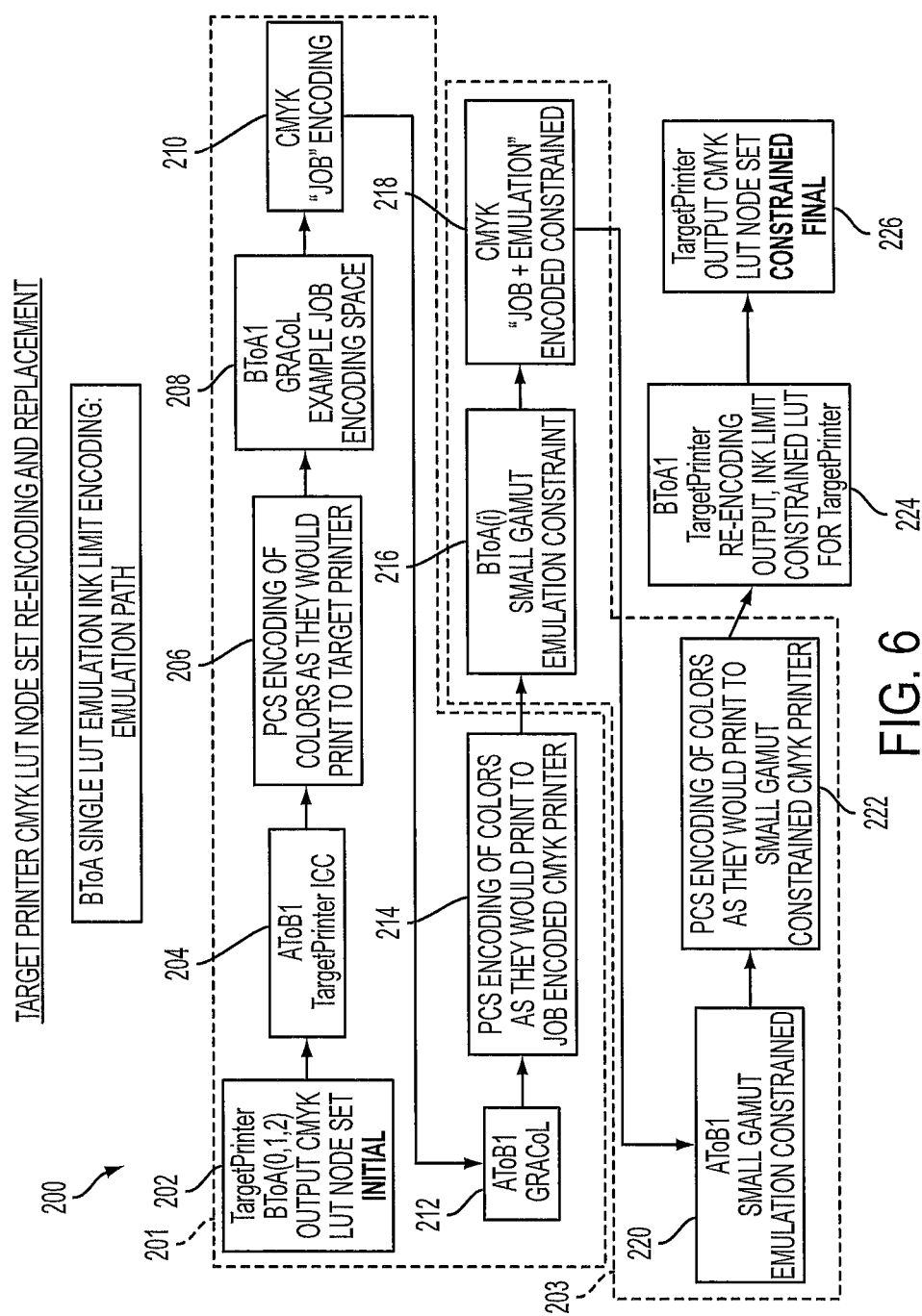
FIG. 6 illustrates an exemplary encoding method for implementing the method of FIG. 5 in accordance with an embodiment.

FIG. 6 illustrates steps of an exemplary encoding method 200 for implementing the method 100 of FIG. 5 for re-encoding and replacing the CMYK LUT node set of the target printer, in accordance with an embodiment. The method 200 results in a final updated ICC profile that is a single BToA re-encoding, ink limited output CMYK set that both emulates the small gamut printer and offers a natural ink limit associated with the smaller gamut. In the non-limiting embodiment shown in FIG. 6, the color space of the ICC profiles is CMYK, and its PCS is CIE L*a*b. Also in this illustrated embodiment, GRACoL® is the example source profile [specification and guidelines] used for the exemplary target printer or press (thus noted as a "GRACoL®" press (or printer)). The concepts of rendering intent and tags used when rendering between color spaces ("BToA", or PCS to device transforms) and when proofing ("AToB", or device to PCS transforms) as shown and described herein should be understood by one of ordinary skill in the art, and thus are not explained in detail herein.

The method 200 includes a first stage 201 of encoding steps for printing to the target printer as well as a, second stage 203 of emulation steps for printing with a smaller gamut. By determining and combining these sets of steps 201 and 203 in the manner disclosed herein, the LUT and thus the ICC profile of the target printer is constrained and re-encoded to determine a new LUT and updated ICC profile for printing.

The encoding and emulation process 200 in FIG. 6 starts with the first stage 201 at 202 with the first ICC profile that represents the target printer that we are printing to. In particular, in this process or method 200, the CMYK values that are in the ICC profile (initial output LUT node set) that will be sent as a job to the target printer are determined (e.g., see 106 shown in method 100 of FIG. 5). Then, standard ICC tags are progressively utilized to re-encode both the job encoding CMYK and a smaller gamut emulation printer encoding, ending by re-encoding for the target printer a set of CMYK nodes colorimetrically for the target printer. For example, as shown at 204, AtoB1 conversion of the target printer ICC/CMYK values from 202 to a PCS encoding (e.g., CIE L*a*b space or CIE XYZ space) is performed by taking the entire target output LUT nodes and using the AToB1 tag for the target printing system and converting every single output node to a PCS encoding of target colors as they would print to a target printer at 206. Then, the PCS encoded target colors are rendered at 208 with the GRACoL® BtoA1 job encoding space, to determine the CMYK job encoding at 210. This conversion is a first step towards converting the entire CMYK LUT to another natural press, while still preserving its ability to print on the target printer. Since the CMYK job encoding values at 210 are only valid to print on GRACoL® press, they are no yet useful. So, the CMYK job encoding values are run through an AToB1 tag of the GRACoL® press at 212, which is just a transformation from the CMYK encoding to the GRACoL® target printer CIE L*a*b* (or CIE XYZ) PCS encoding, so that a set of colors that would print to a GRACoL® press (or job encoded CMYK printer) are obtained at 214. Thus, the first stage 201 is complete, as the CMYK values/LUT nodes of the target printer have been encoded into colors that are from the initial CMYK job/output LUT node sets or GRACoL® encoding space (e.g., see 108 in FIG. 1)(e.g., in CIE L*a*b or CIE XYZ form).

The second stage 203 of the method 200 in FIG. 6 includes using the CIE L*a*b* (or CIE XYZ) PCS encoded colors from 214 and rendering them through a BtoA(i) tag of a smaller gamut printer at 216 (e.g., see 110 in FIG. 5). For example, another or different ICC profile of a printer that a customer wishes to emulate, that represents a smaller gamut (e.g., characterized from a smaller printer), can be selected prior to the implementation of the process (e.g., per a user interface (UI), as described in detail later). As a result of the rendering at 216, CMYK job plus emulation encoding is determined at 218. These CMYK values would be valid to print on that smaller gamut printer. However, because the smaller or different printer is not being used for output, and, rather, the target printer, the CMYK job plus emulation values from 218 are converted and encoded through the AtoB1 tag at 220 (which is the CMYK to L*a*b* tag), which enables one to re-encode the CMYK job plus emulation values to the PCS encoding that is valid for the smaller gamut, as shown at 222 (e.g., see 112 in FIG. 5) (e.g., encoded in CIE L*a*b or CIE XYZ). As such, at this point, the CMYK values that are valid to print to the target printer (the encoded output LUT node set, at 108) have been converted (via processing and further encoding) to a set of colors that are valid for the smaller press (an encoded emulation data set, at 112). The gamut has been limited and the colors are encoded in CIE L*a*b*.

As such, as observed in the first and second stages 201 and 203 in FIG. 6, a new (third) ICC profile configured for output/printing using the target printer can be determined by re-encoding and constraining the determined initial output LUT node set using the encoded emulation output data set. That is, to go back to an ICC profile that can be printed using the target printer, the PCS encoding of smaller gamut target colors from 222 (e.g., encoded in CIE L*a*b or CIE XYZ) are rendered through a BtoA1 tag at 224 to determine a constrained output LUT node data set at 226, or set of CMYK values, that are valid for outputting the job/image data using the target printer, but represent color from the combined process. The constrained data set determined at 226 (output CMYK LUT node set) is constrained by the encoded emulation output data set and ink limited (the amount of ink for output with the target printer is constrained since the gamut is now constrained via the smaller gamut), thereby inheriting a natural ink limit. Printed output colors look like a combination of both ICC profiles of the printers. The resulting, constrained output CMYK LUT node set at 226 (the re-encoded emulation output data set) is provided in and/or used to determine an (third) ICC profile format for printing with the target printer.

The steps of the method 200 shown in FIG. 6 are analogous to the concepts behind the classic emulation workflow shown in FIG. 4, but have been expanded to derive the CMYK job encoding at 210 from the output LUT CMYK node set of the Target Printer ICC at 202, and to determine a final constrained CMYK ICC profile that is a set of updated CMYK nodes that replace the original CMYK node set, thereby constrained by the encoding space and emulation space (i.e., a constrained output LUT node set). Selection of an emulation space that approximates the target ink limit percentage (e.g., 150%) insures that the resultant print output from the target printer does not suffer the pathology of the classic ink limit.

In other words, a destination profile BToA tag set for the target printing system is derived which contains an alternative target "emulation" print system, as replacement output CMYK nodes, both in terms of compression of the gamut boundary (smaller), and in terms of the inheritance of the entire internal part of the gamut. This results in a fully color managed result. Hence, for the case of a BToA inherited emulation printer, the compression associated with an alternative printer and the other printer's internal characteristics, e.g., gamut, mapping techniques, etc. are inherited in such a way as to print colorimetrically correct to the larger target printer gamut.

Figure 7:
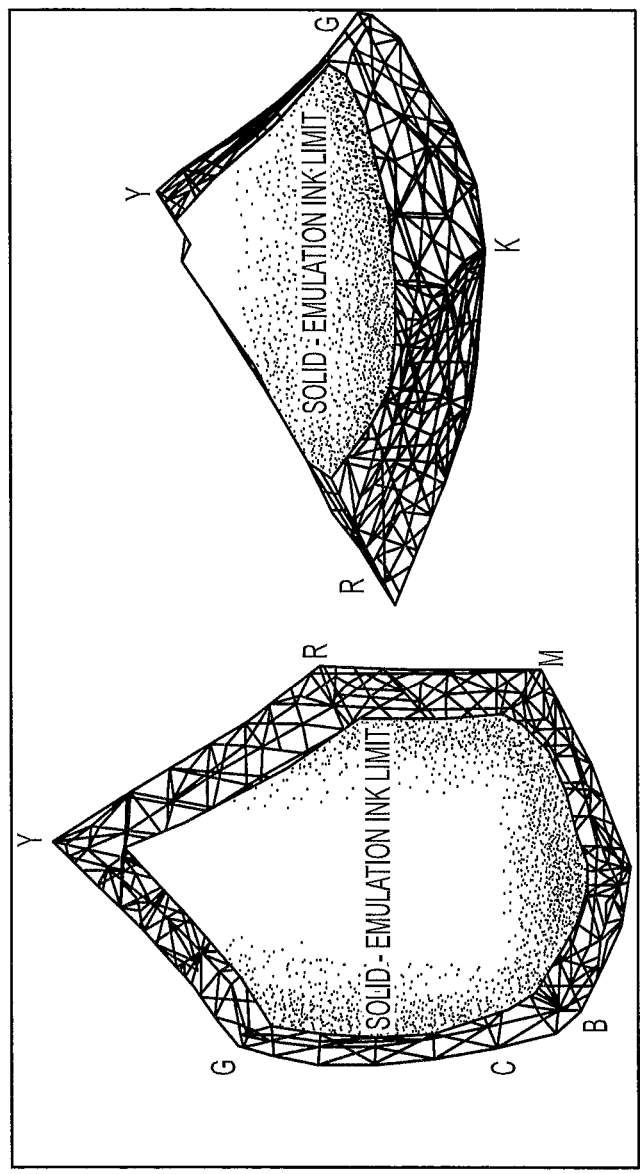
FIG. 7 shows a set of top and side views of a limited gamut when using the herein disclosed ink limiting method or system, in accordance with an embodiment.

FIG. 7 shows a set of top and side graphical views of results of an emulation-based, ink-limited gamut when using the method 200 with the above testing systems and characteristics, in accordance with an embodiment. As shown, the gamut is constrained within a CMYK set that is colorimetrically appropriate for printing to Printer 1. In the non-limiting illustrated embodiment, the natural ink limit of target printer as shown in FIG. 7 is set to an ink limit of about 120 percent (slightly larger than FIG. 3).

While a very aggressive link limit has been applied to the target or original printer (Printer 1), reducing or limiting the total ink to between forty percent (40%) to fifty percent (50%) of its original gamut (depending on job type), the herein disclosed method results in resolving the previously noted issues and inconsistencies of know or classic ink limiting methods, including reducing or substantially resolving the noted mismatched saturation between red, green, blue and cyan, magenta, and yellow. That is, as understood by viewing the graphic in FIG. 7, the disclosed method can simultaneously reducing red, green, blue, cyan, magenta, and black in proportionate amounts. Despite the fact that portions of the gamut (and thus amounts of the ink) have been eliminated, the relative relationship of R, G, B, C, M, and Y has been maintained. Each color reduced in a reasonable and similar way. Accordingly, in an embodiment of this disclosure, constraining the gamut of the determined initial output LUT node set (CMYK values) in the method 100 can further include proportionally limiting data values of the determined initial output LUT node set for output within the smaller gamut of the selected second ICC profile, to thus determine the constrained and emulated output LUT node data set. Thus, when printing with the herein disclosed method, the chromatic colors are roughly and proportionally reduced, and the internal part of the gamut looks like another printer.

Thus, unlike prior methods, whose limited gamut results are shown in FIGS. 2 and 3 according to implementation of a classic ink limit algorithm, the disclosed approach ensures a color managed approach to gamut limitations, resulting in an output print that has little to no mismatch (e.g., magenta very chromatic, and red de-saturated) in chroma across its ranges of colors. The disclosed method and algorithm, when implemented, results in a visually consistent print with consistent saturated color outcomes, since proper compression, rather than clipping, of mismatched dynamic range is built in to this re-encoding and emulation method.

The disclosed method includes utilizing multiple Look Up Tables (LUT)s that merge a job color encoding space with an alternative print encoding space, which is derived from known reduced gamut printing systems relative to the target printer/system. The method completely inherits within a LUT, the smaller gamut boundary, the internal part of another printing system, and also the intersection with the image encoding space. The merged LUT becomes part of an easy to use single, International Color Consortium (ICC) profile, specifically with the intent to ink limit the target printer (while simultaneously taking on the look of another printing system, of smaller gamut)—thereby enabling aggressive, naturally occurring, color managed, ink limiting via a single destination profile, while simultaneously taking on both the gamut boundary and internal print characteristics of another printer. It produces prints with a similar level of de-saturation after ink limit as compared to classic ink limitation methods, without disproportionate reduction of some colors, while maintain other colors for output. The method and algorithm herein introduces an availability of both ink limit and true printer emulation into a single ICC profile. The single destination ICC profile can be communicated to the target printer and/or emailed and shared for others to RIP to. It also enables non-complex CMM systems to achieve true printer emulation without a complex RIP.

The method herein is highly flexible as there are various print gamuts available that can be used for constraint and building a new (third) ICC profile for the target printer. Thus, the constrained LUT and new ICC profiles are based on selecting, emulating, and encoding another (second) ICC profile of a real or existing printing system. By selecting to inherit characteristics from, and thus emulating profiles and LUTs associated with other printing systems, a symmetrical reduction in saturation of colors to the image look to a user (i.e., a look to the naked human eye when printed) is offered. Progressive color de-saturation in a symmetrical gamut reduction is a positive outcome, while preserving compression designed to match encoding space dynamic range to print space.

Although throughout this disclosure there has been reference to the Second another or second ICC profile having a smaller gamut than the target printer, it should be understood by one of ordinary skill in the art that the other or second ICC profile need not be smaller, and that a profile of similar size can be used, emulated, and re-encoded for the target printer. Accordingly, a wide gamut printer or press can be made to print documents that look like any other printing system using a single ICC profile, assuming that the other printing system has a gamut of either the same or similar size, or smaller. Of course, if the gamut of the other, different printer is smaller, the resulting constrained LUT node set and final ICC profile limits the total gamut and thus ink output off of that wide gamut printer or press. If compression is designed into the smaller profile, it preserves the compression designed to bridge mismatched encoding and print space ("black point compensation").

Because of the ink limiting benefits, then, it should be understood that the disclosed method and algorithm is further cost effective. The method can be used to alter to a reduced ink profile to save money. For example, if a customer wishes to reduce costs associated with printing an image, the customer can limit the amount of marked color ink (CMYK), in this case, through selecting a printing system with a smaller gamut to emulate when printing using a particular printer. Enabling ink management enables someone to manage the cost of the job (when output). Accordingly, the method can be implemented for billing purposes, e.g., to regulate and manipulate the billing costs when outputting certain documents.

To implement and provide easy access to the herein disclosed method, a user interface (UI) can be provided that corresponds with at least one processor for implementing the disclosed method. The processor or module can be associated with a digital front end (DFE) of an apparatus or system, for example, or it can be cloud based. The UI can be provided via or associated with a display or screen of a computer (CPU) or a control panel for a system (e.g., system 500 in FIG. 8). The UI may be local or remotely accessed using an Internet or web connection (e.g., via mobile device). The location and accessibility of the UI should not be limiting. In an embodiment, the customer can limit the users capable of accessing and/or changing the selections associated with the UI.

A UI implementation enables customers to easily select the disclosed ink limitation method and can be designed to offer the following:

In an embodiment, a UI drop down selection for the job encoding space is provided, even for RGB jobs, since, once the new, updated and constrained (third) ICC profile is derived, it will be placed as a new destination ICC profile through which all input data will stream.

In an embodiment, a UI drop down selection for the emulation profile or device is provided. This selection can drive the total ink usage (e.g., percent) and final look of output documents from the printing system. In an embodiment, the emulation profiles or devices can be provided in the order of progressively smaller gamut (increased ink reduction), for example, enabling customers to quickly tune ink usage and adaptively learn which selection to make.

In an embodiment, there can be provided instant feedback on ink usage upon completing the above selections for the above two CMYK constraints (e.g., via a screen). Customers, presented with this feedback, can then optionally proceed to select alternatives (e.g., a different emulation profile that originally selected).

In an embodiment, there may be automated placement of the resultant destination ICC profile, in which the constrained ink limit has been placed, for RIP and print usage.

In an embodiment, a selection of custom defaults for the re-use of optimized selections is provided to the customer.

In addition, it should be noted that the UI can allow a customer to read a billing meter, showing a cost (e.g., in U.S. dollars) for printing an image or document. Meter reads may be used for cost-per-copy pricing, for example.

In an embodiment, the disclosed method enables the selection of the job encoding CMYK space combined with a series of graded smaller gamut emulation CMYK space (e.g., via UI selection) are shown to the user. In an embodiment, when two combinations or series of graded smaller gamut spaces are selected, the display may optionally show and present the estimated ink reduction relative to the target printer to the user (based on the smaller printer selected). In another embodiment, when the two combinations or series are selected, the user can select a job which is subsampled, and, ink reduction for that specific job is optionally presented (via the display), which can thereby enable the customer to select combinations of printing systems that reduce ink appropriately for that specific job.

Other scenarios and uses of the UI are further envisioned, and are not limited to the selections and controls noted above. For example, a UI may be simply presented to ask a customer to specify a targeted or preferred ink reduction amount, and a print job for output (and not necessarily asking a customer to select another profile or printer). In an embodiment, the system can then examine the choices available, and optionally present those that most closely match the target ink reduction choice, ask for customer approval for use, and, place the print job on the RIP system for use.

In another embodiment, the process and user selections via UI can be automated after input. For example, in an embodiment, a customer in puts in a targeted ink reduction for a specific print job, and the digital front end using various combinations automatically iterates until it comes to the closest match, and uses that determination. Thus, the customer does not have to manually switch around until they receive a desired output, or approve a determination by the system. The user can simply specify a target ink limit usage (e.g., percentage (%)) within a certain range, and system/method switches and analyzes profiles until it comes up with that range.

Of course, it should be understood that throughout this disclosure a user is defined as a person who is making the choice or selection on what amount of ink would be used for a specific job and/or of the other profile or printer to emulate (e.g., at the digital front end), including, but not limited to: a customer/owner of the machine, technician working for customer, operator of machine, etc. Thus, a user can be whomever is manipulating the process (e.g., at the DFE) to manipulate the outcome/gamut/LUT node set of the target printer.

The kinds of products or systems using the herein disclosed method 100 (or 200) are not limited. Any system with a CMM for softproof, printing, and video output is amenable for use with the approach delineated. The disclosed concept is also valid for audio emulation. Any number of systems can be manipulated when it comes to selecting a gamut of a smaller printer and implementing it into the target printer.

Figure 8:
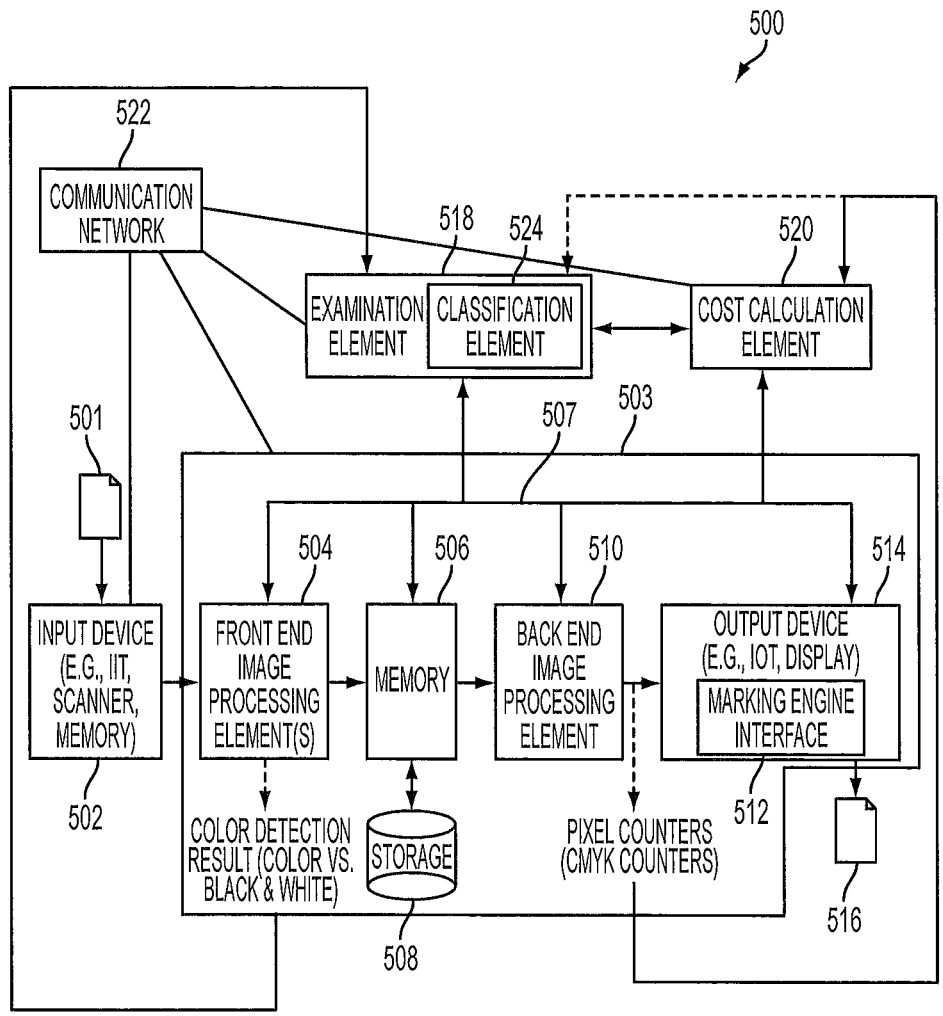
FIG. 8 illustrates an exemplary block diagram of an image path of a system, device, or image processing apparatus, in accordance with an embodiment, comprising at least one processor and an output device, for implementing the method of FIG. 5.

FIG. 8 illustrates a block diagram of an example of an image path 500 for processing image data of a system 503, device or image processing apparatus, for processing documents using the method of FIG. 5 or FIG. 6, according to an embodiment. The system 503 comprises, among other devices, an input device (e.g., IIT or memory) 502, a processor or processing elements represented by 504 and 510, a memory 506 and/or a storage device 508, and an output device (e.g., image output terminal (TOT)) 514 with a marking engine interface 512. Although the image path 500 as shown is part of a single system 503, it should be understood to one of ordinary skill in the art that the processing elements or modules need not be in the same apparatus. In FIG. 8, modules for billing are also shown. The image path 500 of the system 503 may also include an examination element 518 and/or cost calculation element 520 which may be a part of the system 503 itself or in communication with the processing elements 504 and 510, for example. Generally, the above elements (as will be described) of the device are provided to perform functions that assist in receiving image data, configuring the image path of the processing elements 504 and 510 (and possibly elements 518 and 520) to process the image data, including processing and determining a constrained LUT node set and new, updated ICC profile, and outputting the image data such as by printing a document according to an output mode that may be selected and the constrained LUT node set/new, updated ICC profile. However, it should be noted that the apparatus or device may comprise additional elements not described herein or alternative elements for performing similar functions, and should not be limited to those elements as illustrated in FIG. 8. Generally, the image path shown in FIG. 8 corresponds to any number of output modes that may be selected for an image processing apparatus, system, or device.

The input device 502 is used to deliver image data of a document to the system 503 and/or processing elements in the image path. The type of input device 502 is not meant to be limiting. Image data for an original document 501, may be received or input in either device dependent or device independent space from the input device 502.

FIG. 8 shows a processor or processing elements for processing and/or manipulating image data using a plurality of operations and/or processes. The description of the processing element(s) or processor(s) below is an example of devices capable of implementing processes to be performed and should not be limiting. For example, additional processing elements may be provided along the image path 500. Additionally and/or alternatively, additional operations may be performed on the image data other than or in addition to those described with reference to these figures. Accordingly, it should be understood that the phrases "processor" or "processing element" are intended to include any processing device, including a CPU, computer, controller, or other device for processing, managing, and/or handling data.

The image path 500 of system 503 may comprise a plurality of image processing elements (or processor) for manipulating image data received from the input device 502 using a plurality of operations and/or processes. The processing elements may be a combination of image processing elements which comprise software and hardware elements that perform a number of operations on the image data received from the input device 502 (e.g., scanner, memory, or other source) using a set of parameters. The parameters are used to convert the images to the format desired as output (e.g., high quality) along the image path. The processing elements may be a part of a computer system, device, or apparatus such as a xerographic system, a photocopier, a printing device, or a multifunction device (MFD). For simplicity purposes, the term "processing element" throughout the application will refer to one or more elements capable of executing machine executable program instructions. It is to be understood that any number of processing elements May be used and that additional operations or processes besides those described below may be provided in an image path.

More specifically, the image path of FIG. 8 comprises a front end processing element(s) 504, a memory 506, storage 508, and a back end processing element(s) 510. Each of the devices or elements in the image path may be communication with each other, as represented by path 507. The front end processing element(s) 504 may comprise any number of processing elements/modules and is/are image processing elements that receive image data in a beginning of an image path and is/are used to process the image data according to user preferences such that it may be stored and later retrieved for output. The back end processing element(s) 510 may comprise any number of processing elements/modules and is/are generally used at the end of an image path to retrieve stored image data and to process the image data such that the image data may be output to a printing device as an accurate recreation of the original input or scanned image. Of course, processing elements may also be used for compression and/or decompression of image data.

In an embodiment, one or more of the elements (e.g., processing elements 504, 510 and memory 506/storage 508) of system 503 may be connected to a network 522 or telephone system, for example, for communication with other devices, systems, or apparatuses, including those associated with a cloud. For example, in some cases, image data or executable instructions may be provided via a computer (CPU) connected to the network 522. As further described below, in a possible embodiment, at least one processing element of system 503 may implement an operative set of processor executable instructions to perform a method for limiting ink output of marked image data using a target printer. Such executable instructions may be provided via the network 522, for example.

Each of the image processing elements comprises an input and an output. Additionally, the system, device, or apparatus may also include one or more controllers or routers (not shown) to select and route the image data between the processing elements 504 and 510 and memory 506 and/or storage 508, and other elements described below, for example.

Front end processing element(s) 504 receives (e.g., as input) the image data from the input device 502 and processes the image data. Front end processing element(s) 504 may be used to process the received image data as well as determine user-defined operations generally known in the art. For example, the front end processing element 504 may be used for color space conversion, reduction or enlargement, document registration, and/or performing other operations or processes on the image data, for example. In some embodiments, the front end processing element 504 converts the image data (e.g., from device dependent to device independent image data, when received via a scanner) for processing and determines neutral and non-neutral pixels.

Moreover, in accordance with an embodiment, per the herein disclosed method, front end processing element 504 may be used (alone or in cooperation with other elements) to perform a method for limiting ink output of marked image data using a target printer is provided by method 100 and/or 200 (see FIGS. 5 and 6). Further, in an embodiment, the element 504 can be used to determine a billing structure for outputting the image data using the selected ink limit/constrained data set.

Memory 506 and/or storage 508 may be used to store image data. For example, memory 506 and/or storage 508 may be used to temporarily store the original image data of document, or LUTs. Converted (e.g., binary to contone image data) or compressed image data may also be stored in the memory 506 and/or storage 508. Memory 506 and/or storage 508 may be used to store machine readable instructions to be executed by the processor/processing elements (a processor can access the instructions or data stored therein). The memory 506 and/or storage 508 may be implemented using static or dynamic RAM (random access memory), a floppy disk and disk drive, a writable optical disk and disk drive, a hard disk and disk drive, flash memory, volatile or nonvolatile data, or the like, and may be distributed among separate memory components. The memory 506 and/or storage 508 can also include read only memory, or other removable storage drive(s) or memory devices.

The front end processing element(s) 504 may communicate with memory 506 and/or storage 508 of system/apparatus 500 to store processed and/or compressed image data, for example. Compressed image data may be stored in memory 506 and/or storage 508 temporarily or for a later time when needed. When the image data is needed or it is time for marking (e.g., using the marking engine interface 512 of output device 514), the image data may be retrieved from memory 506 and/or storage 508 via the back end processing element(s) 510 to export the image data that has been scanned, for example. Further, the new, updated ICC profile and/or constrained LUT data set can be stored in memory 506 and/or storage 508.

Back end processing element(s) 510 receives processed image data from the memory 506 or storage 508. Back end processing element(s) 510 may be used to further render the image data for output. For example, back end processing element 510 may be used to convert the color space of the processed image data (e.g., convert from device independent CIE L*a*b color space to device dependent CMYK color space), provide color balance, further rendering, filtering, and/or other operations or processes, including, but necessarily not limited to, RIPping the image data according to the constraining LUT/ICC profile. Subsequently, back end processing element(s) 510 may be used to decompress the image data and output the image data via the marking engine 512 and output device 514. The output of processed image data from the back end processing element 510 depends on the image path (or output mode). The back end processing element(s) 510 may be used for calculating the amount of CMY color coverage and/or to determine the toner/ink consumption of the output device 514 (e.g., to inform a user that ink needs to be replaced, for example).

In an embodiment, the processed image data may be directly output to the marking engine interface 512 for printing using an output device 514. The marking engine interface 512 may be associated with an output device 514 such as a printer, a copier, or an MFD which is used for printing documents. In some cases, the marking engine interface may be a part of the output device 514, as shown in FIG. 8. In some cases, the marking engine interface may be separate from the output device 514. The marking engine interface 512 is used to output the processing image data to the printer, for example, and can be used to RIP the image data. The marking engine interface 512 may be designed to receive the reconstructed and processed image data in device independent space in order to send or output the image data via the output device 514 (e.g., printer) for a copy or print job. The marking engine interface 512 may further perform image processing on the image data to make corrections or compensate for deviation in the printing process. Alternatively, the back end processing element(s) 510 may be used to perform further image processing on the image data.

The marking engine interface 512 outputs processed image data to the output device 514 for outputting the image data of the document. The type of output device 514 should not be limiting. For example, the output device 514 may comprise a printing device, a printing press, a copying device, or MFD, and may include other devices (e.g., display, screen).

The display or screen may be a part of a computer (CPU) or user interface (UI), such as one used to select or pre-select another printer (ICC profile) to emulate when printing to a target printer as previously noted, or may be provided to relay information from a website or other device via a network 522, for example. In some cases, the UI may be provided directly on the apparatus/device, while in others a UI is provided as a separate electronic device. It should be noted that the output print quality of image data from an output device 514 such as a MFD may depend on the type of system or device (and its available output modes/resolution), as well as the selected second ICC profile/device used for emulation. Of course, the algorithms and processes used by the elements in the image path shown in FIG. 8 should not be limiting. Any number of data compression algorithms (e.g., lossless, lossy), decompression algorithms, color conversion algorithms (e.g., contone to binary, or binary to grayscale) and the like may be performed on the image data (in addition to method 100) to provide a high quality output document 516, even if the gamut and thus amount of ink used for printing a page is limited.

In an embodiment, the system or apparatus 503 may further comprise one or more elements for determining a billing structure and/or a billing cost for outputting a page or document via an output device such as device 514. For example, as shown in FIG. 8, an examination element 518 and/or cost calculation element 520 are provided in at least in communication with system 503. In an embodiment, the examination element 518 and/or cost calculation element 520 may be a part of the image path 500 of system 503. Examination element 518 may be configured to examine the image data. The examination element 518 may operatively communicate with a cost calculation element 520. The cost calculation element 520 is configured to calculate a billing cost or an approximate cost for outputting the page and/or document of image data using the determined classification. In an embodiment, the elements 518 and/or 520 are separate from the image path of the system 503. In an embodiment, the features, calculations, and/or determinations provided by examination element 518 and/or cost calculation element 520 may be incorporated into one or more processing elements, such as elements 504, 510, or 512, and therefore such elements should not be limited to the illustrated embodiment. Also, the features, calculations, and/or determinations should not be restricted to receiving information from front end processing element 504 and back end processing element 510.

The billing cost may be calculated and based a multi-tiered billing structure (e.g., Tier 1, Tier 2, and/or Tier 3, etc.) and/or other tiers and/or categories and/or classifications, but a cost calculation is not limited thereto. In an embodiment, the billing cost is further calculated based on a type of output device to be used. For example, when copying using a printer or MFD, the chosen type of output device may alter the cost for printing the page or document due to the plurality of output modes, inks, toners, and other elements which contribute to the quality of the output document 516. However, if the gamut of the type of output device is limited based on the disclosed methods herein, the bill associated with printing and outputting a document can be calculated at a different (lesser) rate, if the LUT is constrained and amount of colors for printing have been altered (reduced).

In an embodiment, the cost calculation element 520 is configured to operatively communicate with the examination device 518 and at least one of the processing elements (such as 510 or 512) to calculate a billing cost for outputting the page and/or document. The cost can optionally be output via the UI before marking or printing the image data.

In a possible embodiment, the cost calculated by the cost calculation element 520 (or its associated processing element) may be sent directly to the output device 514. For example, as shown in FIG. 8, the cost calculation element 520 may communicate via path 507 the approximate billing cost to the output device 514. In this case, the cost may be output via a display, screen, or even a print job. By providing the cost in such a manner—i.e., before outputting the image data via a printing or copying output device—the customer can decide if the image data should be marked via interface 512 and output, or if the data should be saved/discarded (e.g., such as if the cost is too high), or if the LUT/ICC profile should be further limited based on another, different printing system (than the one being used or a selected second printer). The customer may choose or select (e.g., see FIG. 5 at 116) to output the image data through the use of an activation button, for example.

Also, it is envisioned that an embodiment in accordance with this disclosure may include a system that utilizes a network connection 522 for proposed estimates with regards to billing and/or ink limitations (e.g., to a certain percentage).

The system 500 for implementing the methods disclosed herein is not limited to particular brands or types of machines (e.g., company make and model), different output resolutions/capabilities, or different print shops, for example. The system may comprise similar elements noted with respect to the image path of the system 500 in FIG. 8, including, but not limited to a communication device (such as a network), examination element, cost calculation element, processor and processing elements, for example. The system may include a personal computer (PC) or display device for displaying an estimated cost being communicated via a connected network. The network may include any type of network such as the Internet, Wi-Fi, DSL, local area network (LAN), or wide area network (WAN), for example.

In accordance with an embodiment, the disclosed algorithm can be used for larger or wider gamut printers—like standard offset presses on coded papers or digital printers that have similar size gamuts, e.g., digital presses, continuous feed (CF) printer—since problems such as those mentioned above occur when a standard offset press profile is applied and the downstream printer applies a standard ink limit. One consequence is that the application of the standard ink limit to these printers basically destroys the image quality. However, when someone wants to substantially limit the amount of ink output from one of these Presses or printers, this disclosure makes it possible to take a smaller gamut press and inherit its properties internally within the (target or in-use) press or printer, which results in limiting the boundary of the gamut, thereby reducing the [amount of output] ink used to print the image data or document, while preserving color management. It also inherits or emulates the internal part of the other natural printer or press.

Other embodiments include incorporating the above methods into a set of computer executable instructions readable by a computer and stored on a data carrier or otherwise a computer readable medium, such that the method 100 or method 200 is automated. In a possible embodiment, the methods may be incorporated into an operative set of processor executable instructions configured for execution by at least one processor. FIGS. 5 and 6 show flow charts of such computer readable and/or executable instructions that, when executed by a computer, direct a computer to perform method 100 or 200, and/or may be implemented by one or more processing elements/processors. For example, in some embodiments, memory or storage of an output device carrying instructions is configured such that when the executable instructions are executed by a computer or processor, they cause a computer or processor to automatically perform a method for limiting ink output of marked image data using a target printer. Such instructions may be contained in memory, for example. In alternative embodiments, hard-wired circuitry may be used in place of or in combination with software instructions to implement the disclosure. Thus, embodiments of this disclosure are not limited to any specific combination of hardware circuitry and software. Any type of computer program product or medium may be used for providing instructions, storing data, message packets, or other machine readable information associated with the method 100. The product or medium can include readable code and/or commands for implementing the method of FIG. 5, according to the exemplary parameters noted above and the resulting graphic of FIG. 7, in accordance with an embodiment. The code can include commands for initial printer encoding, encoding the data for the job, and inheriting and constraining parameters according to the other printer to determine constrained, encoded data for internal use by the target printer (see also example in FIG. 6). The computer readable medium, for example, may include nonvolatile memory, such as a floppy, ROM, flash memory, disk memory, CD-ROM, and other permanent storage devices useful, for example, for transporting information, such as data and computer instructions. In any case, the medium or product should not be limiting.

While the principles of the disclosure have been made clear in the illustrative embodiments set forth above, it will be apparent to those skilled in the art that various modifications may be made to the structure, arrangement, proportion, elements, materials, and components used in the practice of the disclosure. For example, the system 503 may be a computer system which includes a bus or other communication mechanism for communicating information, and one or more of its processing elements may be coupled with the bus for processing information. Also, the memory 506 may comprise random access memory (RAM) or other dynamic storage devices and may also be coupled to the bus as storage for the executable instructions. Storage device 508 may include read only memory (ROM) or other static storage device coupled to the bus to store executable instructions for the processor or computer. Alternatively, another storage device, such as a magnetic disk or optical disk, may also be coupled to the bus for storing information and instructions. Such devices are not meant to be limiting.

Output profiles described herein are of the LUT type, and are used in conjunction with hard copy output device, such as printers and film recorders. Output profiles translate between the PCS and the output color encoding. In the case of a printer profile, the output color encoding might be monochrome, CMYK, RGB or n-color, where n can be up to 16 (although in practice is rarely greater than 6 or 7).

In some workflows there is a further conversion from the output color encoding of the profile to the actual colorants used by the printer, which is usually performed in the printer driver.

Accordingly, it is an aspect of this disclosure to provide a method for transforming an ICC profile of a target printer used for outputting image data using a processor. The method includes the following acts implemented by the processor: for image data to be output: determine an initial output CMYK data set from a LUT table for a color gamut of an ICC profile to output the image data with the target printer; choosing a second ICC profile of a different printer having a limited color gamut, the color gamut of the ICC profile of the target printer having a greater range of CMYK values as compared to a lesser range of CMYK values of the limited color gamut of the second ICC profile; determining an encoded data set from the initial output CMYK data set that inherits the limited color gamut of the of the second ICC profile of the different printer, and determining a constrained output CMYK data set by re-encoding the determined encoded data set, which limits the initial output CMYK data set, in order to output the image data using the target printer based on the limited color gamut of the different printer.

Another aspect provides a processor-implemented method for limiting ink output of marked image data using a target printer associated with at least one processor for processing documents containing image data comprising a plurality of pixels. The method includes the following acts implemented by the at least one processor: receiving image data of a document having a plurality of pixels; determining an initial output LUT node data set for outputting the image data using the target printer, the initial output LUT node set being based on a first ICC profile having a first gamut for the target printer; encoding the initial output LUT node data set for output using the target printer; selecting a second ICC profile of a different printer having a smaller gamut than the first gamut of the first ICC profile of the target printer; further encoding the encoded output LUT node data set by using the selected second ICC profile to determine an encoded emulation data set for output using the smaller gamut of the second ICC profile; and determining a constrained output LUT node data set for outputting the image data using the target printer to thereby mark the image data using a limited amount of ink. The constrained output LUT node set is determined by re-encoding the encoded emulation output data set for output via the target printer, thereby constraining the first gamut of the determined initial output LUT node set by the smaller gamut.

In an embodiment, the constrained output LUT node set is converted into a third ICC profile for outputting the image data using the target printer, such that an amount of ink output by the target printer when the image data is output is constrained per the constrained first gamut. The image data can be marked using the target printer based on the third ICC profile (resulting from the determined constrained output LUT node set).

Yet another aspect provides a system for processing image data. The system includes: an input device for receiving a document containing image data, the image data having a plurality of pixels; at least one processing element for processing the pixels of the image data; and an output device for outputting the document. The at least one processing element is configured to: receive image data of the document; process the image data; determine CMYK values from an output LUT for outputting the image data using a gamut associated with an ICC profile of the output device; encode the CMYK values for outputting the image data; using a second ICC profile with a smaller gamut that is different than the gamut associated with the ICC profile of the output device, determine constrained CMYK values from the encoded CMYK values; encode the constrained CMYK values; and determine constrained CMYK values for outputting the image data using the output device by re-encoding the encoded constrained CMYK values to constrain the gamut of the ICC profile based on the smaller gamut. The at least one processing element can be further configured to: determine an updated, constrained output LUT using the determined constrained CMYK values to form an updated ICC profile used to outputting the image data with the output device.

Still another aspect provides a non-transitory computer readable medium having stored computer executable instructions. The computer executable instructions, when executed by a computer, direct a computer to perform a method for limiting ink output of marked image data using a target printer. The method includes: receiving image data of a document having a plurality of pixels; determining an initial output LUT node data set for outputting the image data using the target printer, the initial output LUT node set being based on a first ICC profile having a first gamut for the target printer; encoding the initial output LUT node data set for output using the target printer; selecting a second ICC profile of a different printer having a smaller gamut than the first gamut of the first ICC profile of the target printer; further encoding the encoded output LUT node data set by using the selected second ICC profile to determine an encoded emulation data set for output using the smaller gamut of the second ICC profile; and determining a constrained output LUT node data set for outputting the image data using the target printer to thereby mark the image data using a limited amount of ink. The constrained output LUT node set is determined by re-encoding the encoded emulation output data set for output via the target printer, thereby constraining the first gamut of the determined initial output LUT node set by the smaller gamut.

While this disclosure has been described in connection with what is presently considered to be the most practical and preferred embodiments, it is to be understood that it is capable of further modifications and is not to be limited to the disclosed embodiments, and this disclosure is intended to cover any variations, uses, equivalent arrangements or adaptations of the inventive concepts following, in general, the principles of the disclosed embodiments and including such departures from the present disclosure as come within known or customary practice in the art to which the embodiments pertains, and as may be applied to the essential features hereinbefore set forth and followed in the spirit and scope of the appended claims.

It will be appreciated that various of the above-disclosed and other features and functions, or alternatives thereof, may be desirably combined into many other different systems/devices or applications. Various presently unforeseen or unanticipated alternatives, modifications, variations, or improvements therein may be subsequently made by those skilled in the art which are also intended to be encompassed by the following claims.

What is claimed is:

1. A method for transforming an ICC profile of a target printer used for outputting image data using a processor, the method comprising the following acts implemented by the processor:

for image data to be output:
  determining an initial output CMYK data set from a LUT table for a color gamut of an ICC profile to output the image data with the target printer;
  choosing a second ICC profile of a different printer comprising a limited color gamut, the color gamut of the ICC profile of the target printer comprising a greater range of CMYK values as compared to a lesser range of CMYK values of the limited color gamut of the second ICC profile;
  determining an encoded data set from the initial output CMYK data set that inherits the limited color gamut of the second ICC profile of the different printer, and
  determining a constrained output CMYK data set by re-encoding the determined encoded data set, which limits the initial output CMYK data set, in order to output the image data using the target printer based on the limited color gamut of the different printer.

2. The method according to claim 1, further comprising:
communicating the constrained output CMYK data set to the target printer for marking and outputting the image data.

3. A processor-implemented method for limiting ink output of marked image data using a target printer associated with at least one processor for processing documents containing image data comprising a plurality of pixels, the method comprising the following acts implemented by the at least one processor:
receiving image data of a document comprising a plurality of pixels;
determining an initial output LUT node data set for outputting the image data using the target printer, the initial output LUT node set being based on a first ICC profile comprising a first gamut for the target printer;
encoding the initial output LUT node data set for output using the target printer;
selecting a second ICC profile of a different printer comprising a smaller gamut than the first gamut of the first ICC profile of the target printer;
further encoding the encoded output LUT node data set by using the selected second ICC profile to determine an encoded emulation data set for output using the smaller gamut of the second ICC profile; and
determining a constrained output LUT node data set for outputting the image data using the target printer to thereby mark the image data using a limited amount of ink,
wherein the constrained output LUT node set is determined by re-encoding the encoded emulation output data set for output via the target printer, thereby constraining the first gamut of the determined initial output LUT node set by the smaller gamut.

4. The method according to claim 3, wherein the constrained output LUT node set is converted into a third ICC profile for outputting the image data using the target printer, such that an amount of ink output by the target printer when the image data is output is constrained per the constrained first gamut.

5. The method according to claim 4, further comprising:
marking the image data using the target printer based on the third ICC profile resulting from the determined constrained output LUT node set.

6. The method according to claim 3, wherein the constraining the first gamut of the determined initial output LUT node set comprises: proportionally limiting data values of the determined initial output LUT node set for output within the smaller gamut of the selected second ICC profile.

7. The method according to claim 3, wherein data of the initial output LUT node set and constrained output LUT node set are processed in CMYK space, and wherein data of the encoded output LUT node set and emulation encoded output LUT node set are encoded in CIE Lab space.

8. A system for processing image data comprising:
an input device for receiving a document containing image data, the image data comprising a plurality of pixels;
at least one processing element for processing the pixels of the image data; and
an output device for outputting the document,
wherein the at least one processing element is configured to: receive image data of the document; process the image data; determine CMYK values from an output LUT for outputting the image data using a gamut associated with an ICC profile of the output device; encode the CMYK values for outputting the image data with the output device; using a second ICC profile with a smaller gamut that is different than the gamut associated with the ICC profile of the output device, determine constrained CMYK values from the encoded CMYK values; encode the constrained CMYK values; and determine constrained CMYK values for outputting the image data using the output device by re-encoding the encoded constrained CMYK values to constrain the gamut of the ICC profile based on the smaller gamut.

9. The system according to claim 8, wherein the at least one processing element is further configured to: determine an updated, constrained output LUT using the determined constrained CMYK values to form an updated ICC profile used to outputting the image data with the output device.

10. The system according to claim 9, wherein the output device is configured to mark the image data based on the updated, constrained output LUT.

11. The system according to claim 8, wherein constraining the gamut of the ICC profile for the determined CMYK values comprises the processor being configured to: proportionally limit the determined CMYK values to the smaller gamut of the selected second ICC profile.

12. The system according to claim 9, wherein data is encoded in CIE Lab space.

13. A non-transitory computer readable medium having stored computer executable instructions, wherein the computer executable instructions, when executed by a computer, direct a computer to perform a method for limiting ink output of marked image data using a target printer, the method comprising:
receiving image data of a document comprising a plurality of pixels;
determining an initial output LUT node data set for outputting the image data using the target printer, the initial output LUT node set being based on a first ICC profile comprising a first gamut for the target printer;
encoding the initial output LUT node data set for output using the target printer;
selecting a second ICC profile of a different printer comprising a smaller gamut than the first gamut of the first ICC profile of the target printer;
further encoding the encoded output LUT node data set by using the selected second ICC profile to determine an encoded emulation data set for output using the smaller gamut of the second ICC profile; and
determining a constrained output LUT node data set for outputting the image data using the target printer to thereby mark the image data using a limited amount of ink,
wherein the constrained output LUT node set is determined by re-encoding the encoded emulation output data set for output via the target printer, thereby constraining the first gamut of the determined initial output LUT node set by the smaller gamut.

14. The medium according to claim 13, wherein the performed method further comprises:
determining a third ICC profile for outputting the image data using the target printer using the constrained output LUT node set, such that an amount of ink output by the target printer when the image data is output is constrained per the constrained first gamut.

15. The medium according to claim 13, wherein the performed method further comprises:
marking the image data using the target printer based on the third ICC profile resulting from the determined constrained output LUT node set.

16. The medium according to claim 15, wherein the constraining the first gamut of the determined initial output LUT node set comprises: proportionally limiting data values of the determined initial output LUT node set for output within the smaller gamut of the selected second ICC profile.

17. The medium according to claim 15, wherein data of the initial output LUT node set and constrained output LUT node set are processed in CMYK space, and wherein data of the encoded output LUT node set and emulation encoded output LUT node set are encoded in CIE Lab space.

* * * * *